UNITED STATES PATENT OFFICE.

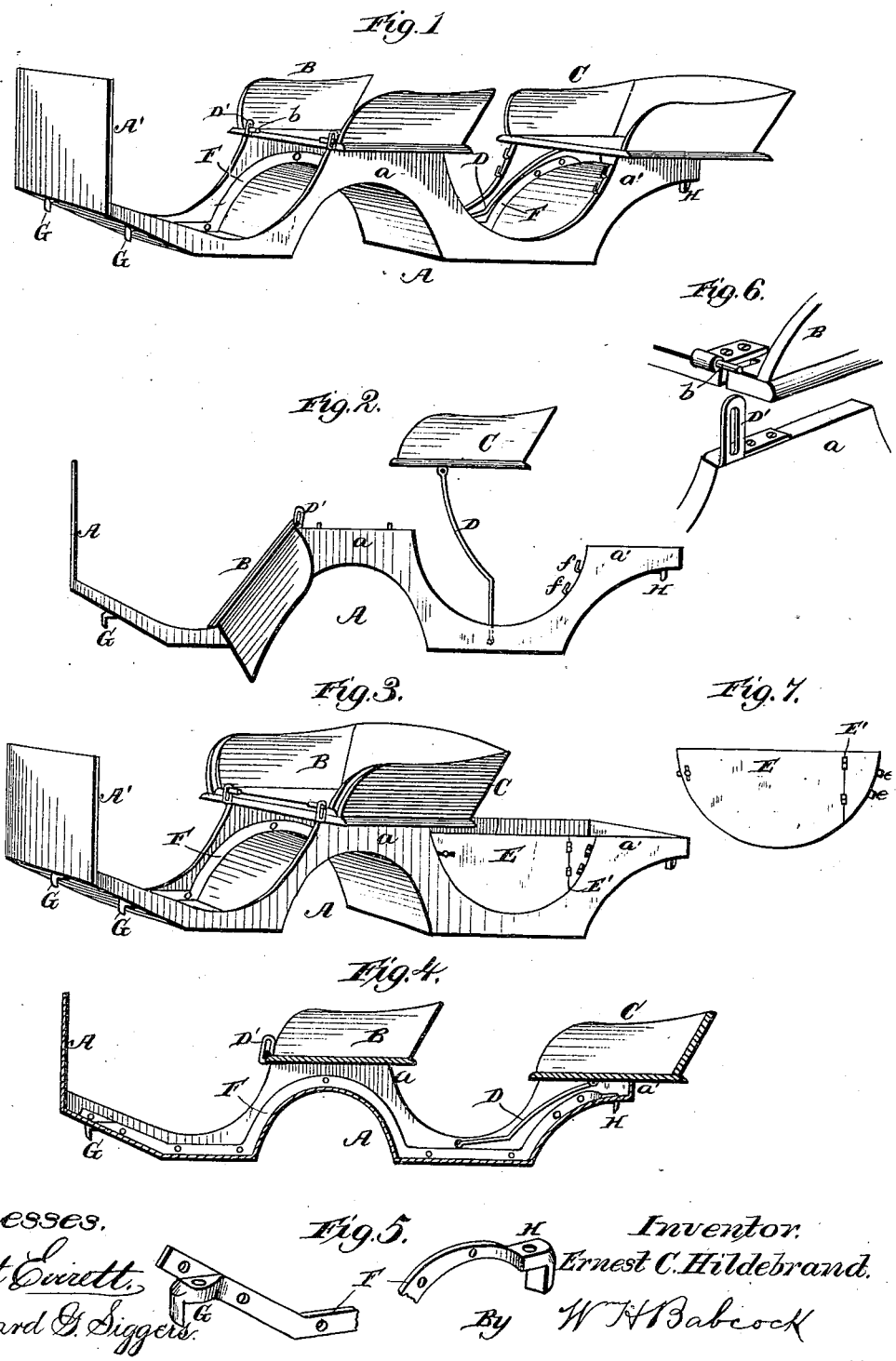

ERNEST C. HILDEBRAND, OF NEW HAVEN, CONNECTICUT.

BUGGY.

SPECIFICATION forming part of Letters Patent No. 262,411, dated August 8, 1882.

Application filed May 27, 1882. (No model.)

*To all whom it may concern:*

Be it known that I, ERNEST CHARLES HILDEBRAND, a citizen of the United States, residing at New Haven, in the county of New Haven and State of Connecticut, have invented certain new and useful Improvements in Buggies and other Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to bodies and folding seats for buggies and other vehicles; and it consists in, first, a rocker-plate for a buggy-body or other light carriage-body, said plate having a loop-head permanently attached thereto; second, a door consisting of two hinged parts, in combination with the body of a buggy or phaeton, and hooks and eyes for connecting said door detachably to said body; third, a vehicle-seat hinged by vertically-movable pintles for the purpose of allowing said seat to be turned forward out of the way of a second seat and then turned back upon the latter without detachment from said body; fourth, in combination with the fixed back part of a vehicle-body, a movable rear seat detached from said fixed back part, and a front seat hinged by vertically-movable pintles to allow said front seat to be turned forward out of the way of the said rear seat and afterward folded back upon and within the latter.

In the accompanying drawings, Figure 1 represents a perspective view of the buggy-body embodying my invention, both seats being in readiness for use. Fig. 2 represents a side elevation of said body, showing the front seat folded down and the rear seat in transit to take its place. Fig. 3 represents a perspective view of said body, showing the same arranged as a single-seat buggy. Fig. 4 represents a vertical longitudinal section on the line of the middle of said body, showing the seats as arranged in Fig. 1. Fig. 5 represents a perspective detail view of one of the rocker-plates and the loop-heads attached thereto. Fig. 6 represents an enlarged detail view of one of the slotted brackets and pintles for attaching the front seat. Fig. 7 represents a detail view of the door.

A designates the body of a double-seat buggy, provided with dash-board A', and having its side pieces formed with raised supports $a$ and $a'$ for front seat, B, and rear seat, C. For lightness and beauty the said parts $a\ a'$ are constructed with curvilinear recesses underneath, and the parts of the body intervening between the two seats and the front seat and dash-board are similarly recessed from above. Both of the seats B and C are movable, in order to allow them to be used separately, as shown in Fig. 1, or to be, when so preferred, folded together and used as a single seat, as shown in Fig. 3. In the latter case the vehicle becomes a single-seat buggy. To allow this the seat C is attached to the upper or rear ends of jointed arms D, the other ends of said arms being attached to the body between the seats. These arms permit said seat to be raised from part $a'$ of the body and moved forward and set down on part $a$ of said body, said arms supporting said seat in transit. Seat B is hinged to said part $a$ of the body by means of lateral pintles $b$, attached to the front corners of said seat, which enter vertically-slotted brackets or plates D', which are attached to the front corners of part $a$, said brackets rising a little above the latter.

Before shifting seat C the front seat, B, is turned down, as shown in Fig. 2. The seat C then takes its place on part $a$, as stated. The seat B is then turned back. In the act of doing so the proximate edges of the two seats come in contact, and pintles $b$ rise in the slotted brackets D' sufficiently to let seat B set upon and within seat C. The two then constitute a single seat, as shown in Fig. 3.

The space between parts $a$ and $a'$ has hitherto usually been left open in buggies, and Fig. 1 shows it so; but I prefer to protect the feet and legs of the occupants of the rear seat by means of doors E, (shown in Figs. 3 and 7,) which entirely close the space between parts $a$ and $a'$. Each door is provided on its rear edge with loops $e\ e$, which set over hooks $f\ f$, attached to part $a'$, allowing said doors to be conveniently raised and detached, but securing them firmly until thus lifted. Fig. 2 shows the body after the doors have been removed.

Of course they will sometimes be found convenient, even when the vehicle is to be used as a one-seat buggy, because they convert the space behind the seat into a closed receptacle for packages and articles. However, their detachability gives the owner the option of using them or not, as he may prefer. Each door is divided vertically near its attachments *e f*, and the two parts of it are hinged together at E′, so that the door will open freely on this hinge, and the attachments *e f* are not required to act as hinges. Interlocking hooks or hooks and recesses may be used instead of hooks and loops.

The two side pieces or rockers of body A are respectively provided with rocker-plates, one to each, which extend from end to end of said rockers or side pieces and brace the same. One of said rocker-plates is shown in Fig. 5, (marked F,) and having a loop-head, G, welded to it near its forward end, and a loop-head, H, welded to it near its rear end. The construction of each rocker-plate and the method of attaching the loops are the same as those used with the other plate. Of course the loops may be made in one piece with their respective plates; or they may be permanently attached by other means than welding. These loops are used for the suspension of the under gearing. The rear ends of the side pieces or rockers extend as far back as the rear ends of said rocker-plates and loop-heads, and protect the latter. These loop-heads are not even visible on a side view. My construction does not require any bolts to be inserted into the wood-work, and I thereby avoid wear and rotting. My combined rocker-plate and loop-heads can be cheaply manufactured, and will be found very strong and durable. Of course a rocker-plate made with only one loop-head would be serviceable, the other loop-head being differently attached to the body; but the construction shown is obviously preferable.

I am aware that it is not broadly new to construct a double-seat buggy with a front seat which may be folded forward out of the way of the rear seat and afterward set back upon the latter to make a single seat, and therefore I do not broadly claim the same; but

Having thus fully described my invention, what I claim as new, and desire to secure by Letters Patent, is—

1. A rocker-plate for a buggy-body or other light carriage-body, said plate having a loop-head permanently attached thereto.

2. A door consisting of two hinged parts, in combination with the body of a buggy or phaeton and hooks and eyes for connecting said door detachably to said body.

3. In combination with the fixed back part of a vehicle-body, a movable rear seat detached from said fixed back part, and a front seat hinged by vertically-movable pintles to allow said front seat to be turned forward out of the way of the said rear seat and afterward folded back upon and within the latter.

4. Vertically-slotted pieces attached to or forming part of a wagon-body or buggy-body, in combination with a seat having pintles which sit within said slots, and another seat operating on shifting arms, the two seats folding together, as set forth.

In testimony whereof I affix my signature in presence of two witnesses.

E. CHARLES HILDEBRAND.

Witnesses:
J. GIBB SMITH,
EDWARD J. ALLING.